US009209550B2

(12) United States Patent
Kinoshita et al.

(10) Patent No.: US 9,209,550 B2
(45) Date of Patent: Dec. 8, 2015

(54) BATTERY WIRING MODULE
(71) Applicants:AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Yuko Kinoshita, Yokkaichi (JP); Katsunori Hamana, Yokkaichi (JP); Mitsuhiro Akasaka, Yokkaichi (JP); Tetsuya Nakagawa, Yokkaichi (JP); Yoshinao Kobayashi, Yokkaichi (JP); Masaru Shitamichi, Yokkaichi (JP); Daiki Hirano, Utsunomiya (JP)

(73) Assignees: AUTONETWORKS TECHNOLOGIES, LTD., Mie (JP); SUMITOMO WIRNG SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 81 days.

(21) Appl. No.: 14/353,738
(22) PCT Filed: Oct. 19, 2012
(86) PCT No.: PCT/JP2012/077068
§ 371 (c)(1),
(2) Date: Apr. 23, 2014
(87) PCT Pub. No.: WO2013/061870
PCT Pub. Date: May 2, 2013

(65) Prior Publication Data
US 2014/0287622 A1  Sep. 25, 2014

(30) Foreign Application Priority Data
Oct. 26, 2011  (JP) ................................ 2011-235180

(51) Int. Cl.
*H01R 33/00* (2006.01)
*H01R 13/42* (2006.01)
(Continued)

(52) U.S. Cl.
CPC ............... *H01R 13/42* (2013.01); *H01M 2/206* (2013.01); *H01M 2/305* (2013.01); *H01M 10/48* (2013.01); *H01M 2250/20* (2013.01); *Y02T 90/32* (2013.01)

(58) Field of Classification Search
CPC ........................... Y02E 60/12; H01R 13/2442
USPC .......... 429/121, 122, 151, 158–160; 439/500, 439/626, 627
See application file for complete search history.

(56) References Cited

U.S. PATENT DOCUMENTS 8,545,271 B2 * 10/2013 Henmi ................ H01M 2/1083
439/208

(Continued)

FOREIGN PATENT DOCUMENTS

CN   101950989 A    1/2011
JP   A-2011-008957  1/2011

(Continued)

OTHER PUBLICATIONS

Dec. 4, 2012 International Search Report issued in International Application No. PCT/JP2012/077068.

(Continued)

*Primary Examiner* — Thanh Tam Le
(74) *Attorney, Agent, or Firm* — Oliff PLC (57) ABSTRACT

A battery wiring module to be attached to a cell group includes a plurality of cells each having positive and negative electrode terminals. The battery wiring module includes a busbar connecting the electrode terminals, a voltage sensing terminal overlapped with the busbar and connected to one of the electrode terminals, and an insulation protector including a housing and a wire guiding groove. The voltage sensing terminal is configured to sense a state of the cell group. The busbar and the voltage sensing terminal are housed in the housing. The wire guiding groove is configured to guide a sensing wire that extends from the voltage sensing terminal to extend out of the housing. In the housing, a bus bar lock tab and a sensing terminal lock tab are formed on one elastic locking piece.

5 Claims, 11 Drawing Sheets

(51) Int. Cl.
*H01M 2/20* (2006.01)
*H01M 2/30* (2006.01)
*H01M 10/48* (2006.01)

(56) References Cited

U.S. PATENT DOCUMENTS

| | | | |
|---|---|---|---|
| 8,563,161 B2 | 10/2013 | Ogasawara et al. | |
| 8,858,244 B2* | 10/2014 | Ogasawara | H01M 2/34 439/135 |
| 8,859,134 B2* | 10/2014 | Ikeda | H01M 2/1077 429/158 |
| 8,999,552 B2* | 4/2015 | Ogasawara | H01R 9/226 429/121 |
| 2011/0008669 A1 | 1/2011 | Ogasawara et al. | |
| 2011/0045329 A1 | 2/2011 | Ikeda et al. | |
| 2014/0256178 A1* | 9/2014 | Kinoshita | H01R 13/60 439/529 |
| 2014/0315441 A1* | 10/2014 | Kinoshita | H01M 2/1077 439/627 |
| 2014/0329136 A1* | 11/2014 | Kinoshita | H01M 2/1077 429/158 |

FOREIGN PATENT DOCUMENTS

| | | |
|---|---|---|
| JP | A-2011-018499 | 1/2011 |
| JP | A-2011-040335 | 2/2011 |
| JP | A-2011-060675 | 3/2011 |

OTHER PUBLICATIONS

Dec. 4, 2012 Written Opinion issued in International Application No. PCT/JP2012/077068 (with partial translation).

Dec. 9, 2014 Japanese Office Action issued in Application No. 2011-235180.

Aug. 3, 2015 Office Action issued in Chinese Patent Application No. 201280052816.8.

Jul. 30, 2015 Office Action issued in Japanese Patent Application No. 2011-235180.

* cited by examiner

BATTERY WIRING MODULE

TECHNICAL FIELD

The present invention relates to a battery wiring module.

BACKGROUND ART

A battery module for an electric vehicle or a hybrid vehicle includes a plurality of cells that are arranged next to each other. Each of the cells includes a flat body having a power generation element therein and positive electrode and negative electrodes. The electrodes of adjacent cells are connected via a connecting member to connect the cells in series or in parallel.

Patent Document 1 below describes a battery wiring module that includes a connecting member, a voltage sensing wire configured to determine the voltage of the cell, and a base that houses the connecting member and the voltage sensing wire. The battery wiring module is attached to a cell group such that an electrode terminal of each cell is passed through a terminal through hole formed in each connecting member. Then, a nut is screwed and fastened to electrically connect the cells. The base includes a pair of locking protrusions that prevents the connecting member from slipping out of the base. When the connecting member is inserted into the base, the locking protrusions are elastically deformed to allow the connecting member to be inserted into the base. After the insertion, the locking protrusions are elastically restored to lock the connecting member.

RELATED ART DOCUMENT

Patent Document

Patent Document 1: Japanese Unexamined Patent Publication No.

In Patent Document 1, the voltage sensing wire is not connected to the connecting member, and a terminal portion specifically for connecting the voltage sensing wire, which is a separate member from the connecting member, is made of a flat metal piece like the connecting member. In such a case, the electrode terminal is passed through the terminal portion for the voltage sensing wire and the connecting member that are overlapped with each other. Then, the terminal portion for the voltage sensing wire and the connecting member are fixed together by a nut, for example, and connected to the electrode terminal, and thus the voltage sensing wire is ready for sensing the voltage between the electrodes. In this configuration, a member for locking the terminal portion in the base is required in addition to the locking protrusions for locking the connecting member in the base.

However, if the base includes locking portions that are configured to lock the connecting member and the terminal portion for the voltage sensing wire, the dimension of the locking portions should be precisely controlled to properly prevent the connecting member and the terminal portion for the voltage sensing wire from slipping out of the base, and thus the number of locking portions whose dimension should be precisely controlled may increase. Further, it is not preferable to cut the wall of the base, for example, to form multiple elastically deformable locking portions, because the formation is difficult. When the terminal portion specifically for the voltage sensing wire is provided as a separate member from the connecting member, it is preferable to provide the locking portion for each of the connecting member and the terminal portion for the voltage sensing wire with a simple configuration.

Therefore, there is a need in the art to provide a battery wiring module that can prevent a connecting member and a sensing terminal from slipping out of the base with a simple configuration.

SUMMARY

The present invention relates to a battery wiring module to be attached to a cell group including a plurality of cells each having positive and negative electrode terminals. The battery wiring module includes a connecting member connecting the electrode terminals, a sensing member overlapped with the connecting member and connected to one of the electrode terminals, an insulation protector including a housing and a wire guiding groove, an elastic locking piece formed in the housing and configured to be elastically deformed, a connecting member lock tab formed on the elastic locking piece and configured to lock the connecting member, and a sensing member lock tab formed on the elastic locking piece and configured to lock the sensing member. The sensing member is configured to sense a state of the cell group. The connecting member and the sensing member are housed in the housing. The wire guiding groove is configured to guide a sensing wire extending from the sensing member to extend out of the housing.

As above, multiple lock tabs can be gathered in one place by forming the connecting member lock tab, which locks the connecting member, and the sensing member lock tab, which locks the sensing member, on the same elastic locking piece. With this configuration, compared to the case in which the lock tabs are formed in different places, the dimension accuracy of the lock tabs can be easily controlled. This simplifies the structure of a molding die for forming the elastic locking piece, the connecting member lock tab, and the sensing member lock tab. Thus, the die can be provided with a long lasting quality.

According to the present invention, the connecting member and the sensing terminal can be prevented from slipping out with a simple configuration.

MODES FOR CARRYING OUT THE INVENTION

First Embodiment

Figure 1:
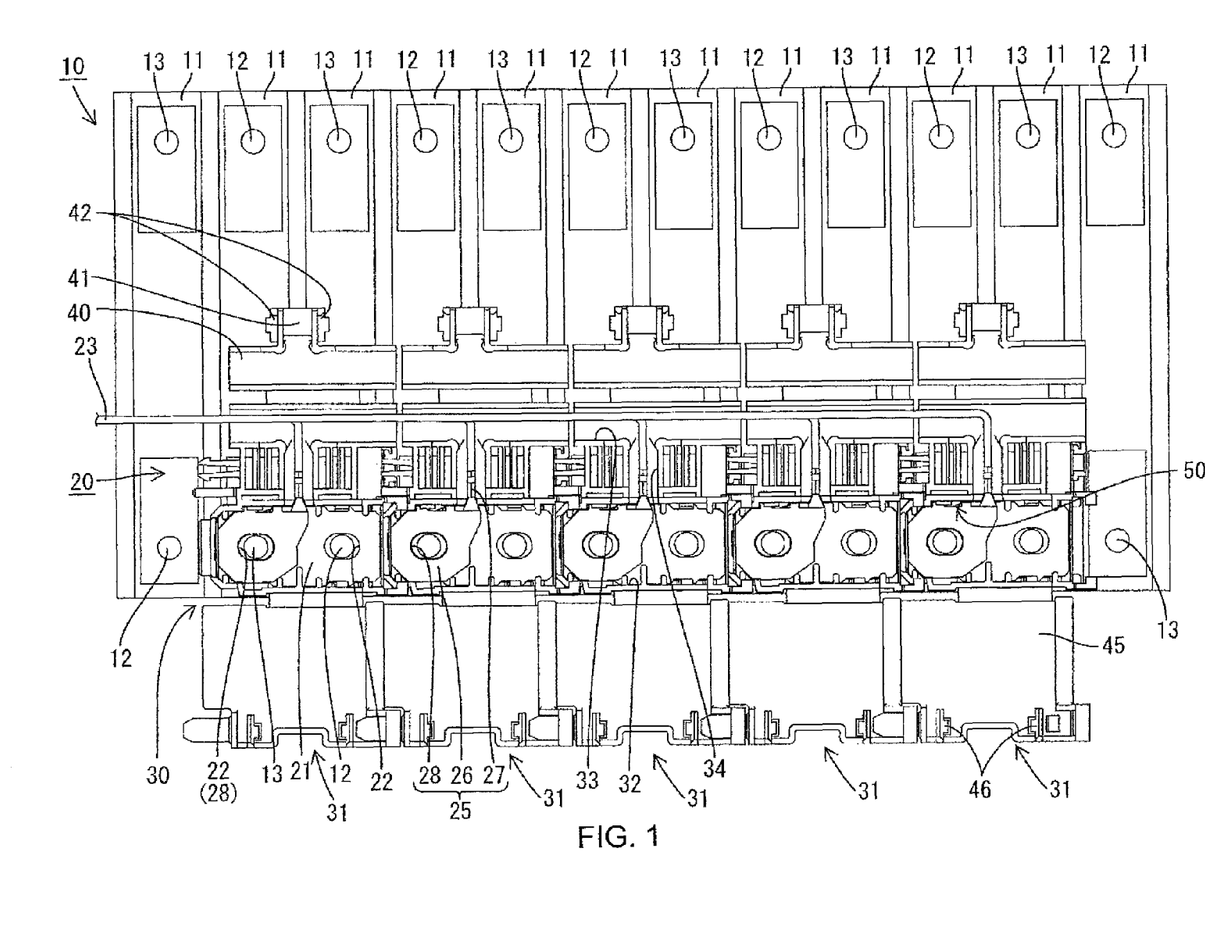
FIG. 1 is a top view of a battery module to which a battery wiring module according to a first embodiment of the present invention is attached.

A first embodiment of the present invention will be described with reference to FIG. 1 to FIG. 9. As illustrated in FIG. 1, a battery module 10 includes a cell group including a plurality of cells 11 and a battery wiring module 20 of this embodiment that is attached to the cell group. The battery module 10 is used as a drive source of a vehicle such as an electric vehicle and a hybrid vehicle, for example. In the following description, an upper side, a lower side, a front side with respect to a paper surface, and a rear side with respect to a paper surface in FIG. 1 correspond to a front side, a rear side, an upper side, and a lower side, respectively. A right to left direction in FIG. 1 corresponds to a connection direction.

(Battery Module)

As illustrated in FIG. 1, the battery module 10 includes a plurality of cells 11 (corresponding to the cell group) that are arranged horizontally and the battery wiring module 20 that is attached to the cells 11.

(Cell)

The cell 11 includes a cuboidal body and a pair of electrode terminals 12, 13 that protrude from front and rear ends of a predetermined surface (an upper surface) of the body. The body houses a power generation element which is not illustrated. One of the electrode terminals 12, 13 is a positive terminal and the other is a negative terminal. The electrode terminals 12, 13 have threaded circumferential surfaces. The cells 11 are arranged horizontally such that a front side and a rear side of adjacent cells are opposite to have different adjacent polarities (the positive electrode and the negative electrode are alternately arranged in a horizontal direction). The cells 11 are fixed by a retainer, which is not illustrated, and constitute the cell group including the horizontally arranged cells 11.

(Battery Wiring Module)

Two battery wiring modules 20 are arranged horizontally along two groups of the electrode terminals 12, 13 on the front and rear ends (the upper and lower ends in FIG. 1) of the cell group. FIG. 1 illustrates only the battery wiring module 20 on the rear side.

As illustrated in FIG. 1, the battery wiring module 20 includes a plurality of busbars 21 (corresponding to a connecting member) and a plurality of voltage sensing terminals 25. Each busbar 21 connects electrode terminals 12, 13 that are adjacent to each other in an insulation protector 30 made of synthetic resin. Each voltage sensing terminal 25 is configured to sense the voltage of the corresponding cell 11 that is overlapped with each of the busbars 21.

(Bulbar)

Figure 2:
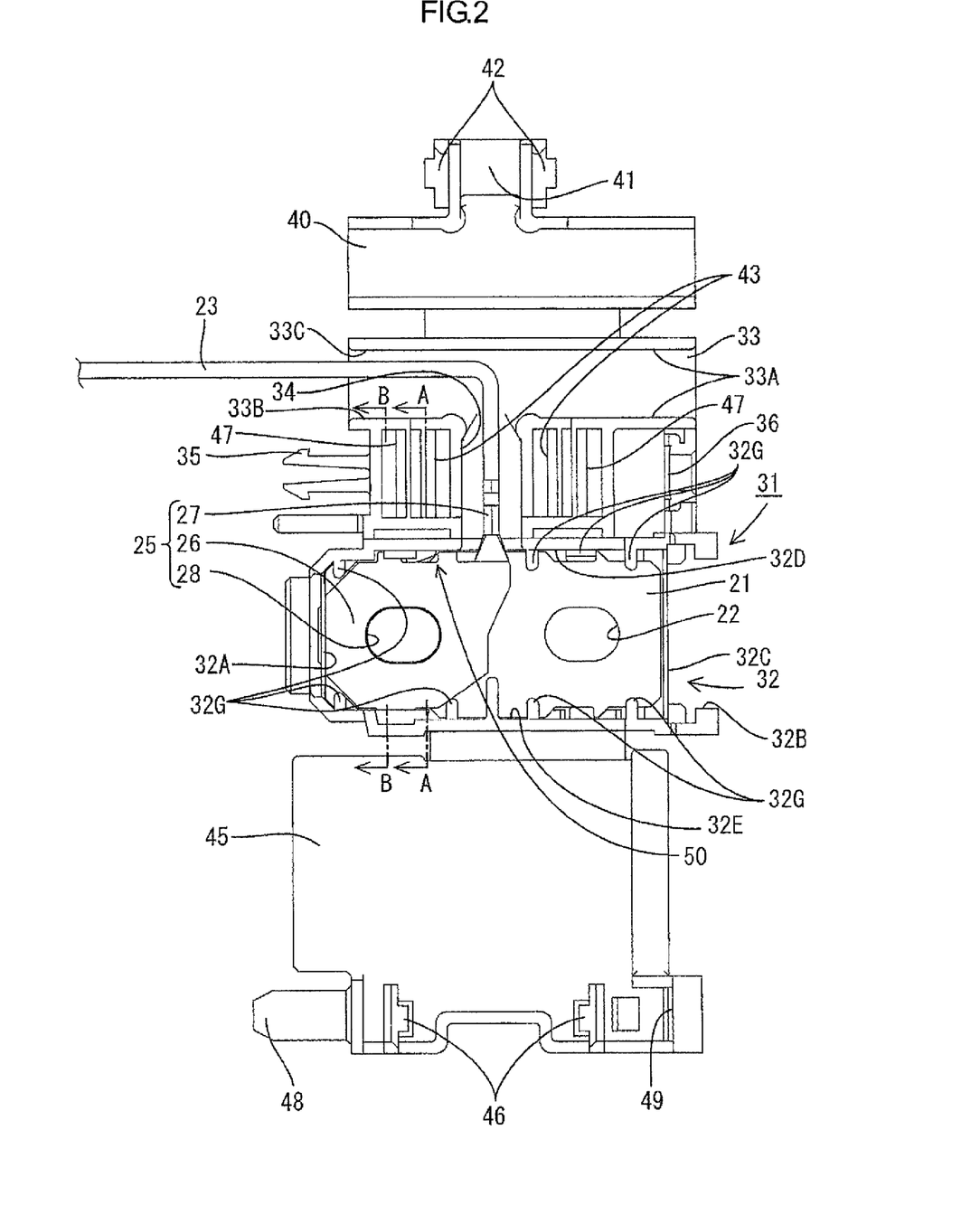
FIG. 2 is a magnified top view of one of housing units included in the battery wiring module.

The busbar 21 is made of metal such as copper, copper alloy, stainless steel (SUS), and aluminum. As illustrated in FIG. 1 and FIG. 2, the busbar 21 has a plate-like shape with a length corresponding to a dimension between the terminal electrodes 12, 13 of adjacent cells 11 and has a pair of through holes 22 to which the electrode terminals 12, 13 can be inserted. The through hole 22 has an elliptical shape elongated in the connection direction. This can absorb an error in dimension between the electrode terminals 12, 13 that is caused by a dimensional tolerance and an assembly tolerance of each cell 11.

(Voltage Sensing Terminal)

The voltage sensing terminal 25 that is overlapped with the busbar 21 includes a rectangular plate 26 (corresponding to a sensing member) and a crimping member 27 that protrudes from the plate 26. The crimping member 27 crimps a sensing wire 23 that is configured to sense the voltage of each cell 11. The plate 26 includes an insertion hole 28 that extends through a middle of the plate 26. The insertion hole 28 is communicated with one of the through holes 22 of the busbar 21, and corresponding one of the electrode terminal 12 (13) can be inserted into the insertion hole 28.

The sensing wire 23 that is connected to the voltage sensing terminal 25 is gathered in a wire housing groove 33 of an insulation protector 30, which will be described later, and connected to a battery ECU (not illustrated) that is disposed on a right side in FIG. 1. In the battery ECU, a microcomputer and an element, for example, are mounted. The battery ECU has a known configuration to determine the voltage, the current, and the temperature, for example, and monitor and control the cells 11.

(Insulation Protector)

As illustrated in FIG. 1, the insulation protector 30 includes a plurality of housing units 31 (five housing units 31 in this embodiment) that are connected in the right-left direction. An arrangement direction of the housing units 31 corresponds to a wiring direction of the sensing wire 23 and further corresponds to the arrangement direction of the cells 11 in this embodiment.

(Housing Unit)

The housing unit 31 is made of synthetic resin. As illustrated in FIG. 2, the housing unit 31 includes a housing 32, a wire housing groove 33, and a wire guiding groove 34. The housing 32 houses the busbar 21 and the voltage sensing terminal 25 that is overlapped with the busbar 21. The wire housing groove 33 extends parallel with the housing 32 and a right end and a left end thereof are open to the outside. The wire guiding groove 34 is communicated with the housing 32 and the wire housing groove 34.

(Housing)

The housing 32 has a box-like shape elongated in the right-left direction (the connection direction) to house the busbar 21. The housing 32 includes a surrounding wall frame 32A (corresponding to an inner wall), a side opening 32B, and a bottom plate 32C. The surrounding wall frame 32A surrounds the busbar 21 on three sides (sides except for the right side in FIG. 2). The busbar 21 can be inserted into the housing 32 through the side opening 32B in the horizontal direction from the right side in FIG. 2. The busbar 21 housed in the housing 32 is placed on the bottom plate 32C. The surrounding wall frame 32A includes wall surfaces that extend in the right-left direction, namely, a front wall surface 32D and a rear wall surface 32E. An upper end of the surrounding wall frame 32A is a top opening 32F (see FIG. 7 and FIG. 8), and an upper part of the housing 32 opens to the outside such that the voltage sensing terminal 25 can be inserted from the above. Further, a plurality of busbar holders 32G that are configured to prevent the busbar 21 from moving in the up-down direction protrude inwardly from the front wall surface 32D and the rear wall surface 32E.

(Wire Guiding Groove)

The wire guiding groove 34 is a recess groove extending in the front-rear direction. The wire guiding groove 34 extends through the front wall surface 32D extending in the right-left direction, which is one of walls of the surrounding wall frame 32A of the housing 32, to be communicated with the housing 32 and extends through the rear groove wall 33B, which is one of groove walls 33A of the wire housing groove 33, to be communicated with the wire housing groove 33. The wire guiding groove 34 is configured to guide the crimping member 27 of the voltage sensing terminal 25 and the sensing wire 23 crimped by the crimping member 27 from the housing 32 to the wire housing groove 33.

(Wire Housing Groove)

The wire housing groove 33 includes a pair of groove walls 33A extending in the right-left direction and is a recess groove in a cross section. The housing units 31 that are connected with each other provide one through groove that extends in the right-left direction. Each sensing wire 23 that is guided along the wire guiding groove 34 of each housing unit 31 is bent at a substantially right angle by the wire housing groove 33 so as to extend along the extending direction of the wire housing groove 33 to the left side toward the battery ECU.

(First Cover)

Figure 8:
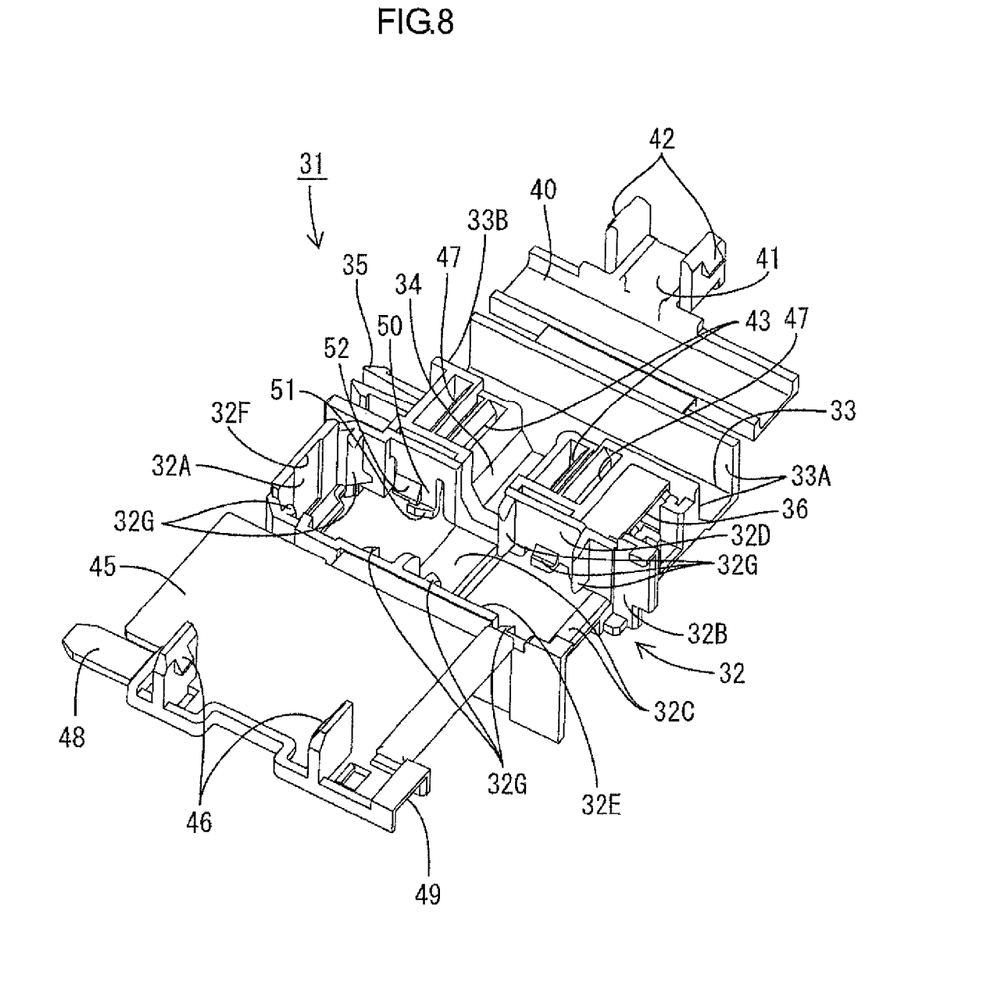
FIG. 8 is a perspective view of the housing unit.

As illustrated in FIG. 1, FIG. 2, and FIG. 8, a first cover 40 is integrally formed with the wire housing groove 33 via a hinge at a side surface of the front groove wall 33C of the groove walls 33A. The first cover 40 is rotatable about the hinge and is configured to cover the entire of the wire housing groove 33 from the above when the first cover 40 is closed. A guiding-groove cover 41 that is configured to cover the wire guiding groove 34 from the above in a closed state extends from the first cover 40. A pair of first locking pieces 42 protrudes from the guiding-groove cover 41. A first locking groove 43 is formed at each side in the width direction of the wire guiding groove 34. The first locking pieces 42 and the first locking grooves 43 are locked together to retain the closed state of the first cover 40.

(Second Cover)

As illustrated in FIG. 1, FIG. 2, and FIG. 8, a second cover 45 is integrally formed with the housing 32 via a hinge at a side surface of the rear wall surface 32E of the surrounding wall frame 32A. The second cover 45 is rotatable about the hinge and is configured to cover the entire of the housing 32 and the wire guiding groove 34 when the second cover 45 is closed. As illustrated in FIG. 1, FIG. 2, and FIG. 8, a pair of second locking pieces 46 protrudes from a surface, which becomes a lower surface of the second cover 45 when the second cover 45 is closed. Further, second locking grooves 47 that are configured to lock the second locking pieces 46 are provided at positions outwardly of the first locking grooves 43 that are each positioned on each side of the wire guiding groove 34. When the second cover 45 is closed after the first cover 40 is closed, the wire guiding groove 34 is covered by both of the guiding-groove cover 41 of the first cover 40 and the second cover 45. By locking the second locking piece 46 in the second locking groove 47, the upper portion of the entire housing unit 31 can remain covered by the first cover 40 and the second cover 45.

Next, a coupling structure of the housing units 31 will be described. As illustrated in FIG. 2, FIG. 5, FIG. 6, and FIG. 8, a lock tab for connection 35 is disposed on a left side of the second locking groove 47 that is located on the left side of the wire guiding groove 34. The lock tab 35 protrudes in the connection direction (the right-left direction). A locking recess for connection 36 that is configured to fit with the lock tab 35 of the housing unit 31 to be connected is disposed on the right side of the second locking groove 47 that is located on the right side of the wire guiding groove 34. The lock tab for connection 35 includes a pair of elastic pieces, and the elastic pieces are elastically deformable toward each other. The locking recess for connection 36 is a recces groove and is configured to receive the lock tab for connection 35. The lock tab 35 is elastically deformed to be inserted into the lock tab 35 and elastically restored therein.

A cover connection lock tab 48 protrudes from a left lower end of the second cover 45. A cover connection locking hole 49 that is configured to receive the cover connection lock tab 48 of the housing unit 31 to be connected is disposed at a right end of the second cover 45. The cover connection locking hole 49 has a ring-like shape that has a through hole extending in the connection direction. The adjacent second covers 45 are coupled by inserting the cover connection lock tab 48 into the cover connection locking hole 49.

Next, a configuration of a main part of this embodiment will be described in detail. As illustrated in FIG. 8, the housing 32 of the housing unit 31 includes an elastic locking piece 50, which is a different part from the above-described busbar holder 32G. The elastic locking piece 50 is configured to prevent the busbar 21, which is housed in the housing 32, from slipping out in the right-left direction and lock the voltage sensing terminal 25 that is inserted from the above. The elastic locking piece 50 is included in the front wall surface 32D at a position corresponding to the busbar 21 and the voltage sensing terminal 25 that are overlapped with each other. Specifically, as illustrated in FIG. 7 and FIG. 9, the elastic locking piece 50 has a cantilevered shape that is obtained by cutting the front wall surface 32D along two parallel lines from the lower end to substantially the center of the front wall surface 32D in the up-down direction, and thus the elastic locking piece 50 is integrally formed with the front wall surface 32D.

Figure 7:
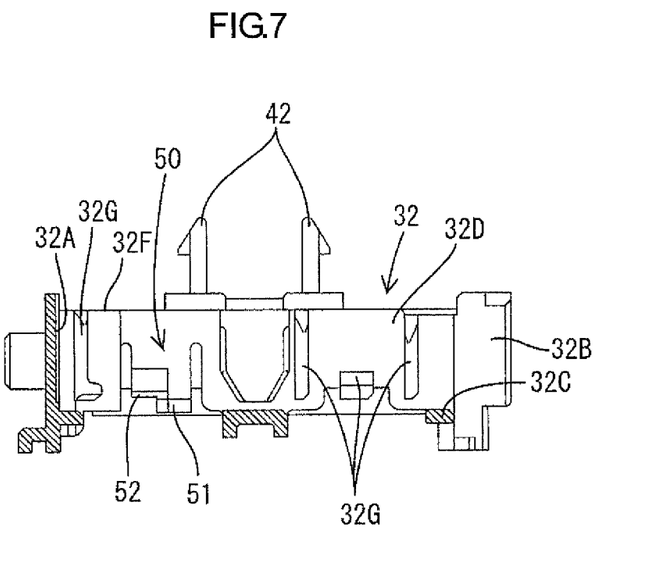
FIG. 7 is a cross-sectional view taken along a line C-C in FIG. 6.
Figure 9:
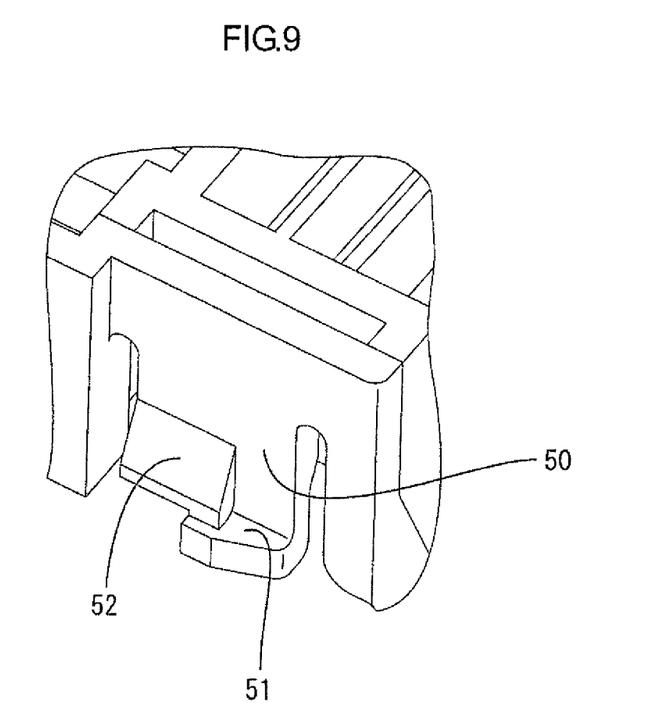
FIG. 9 is a magnified perspective view of an elastic locking piece.

As illustrated in FIG. 7 and FIG. 9, a busbar lock tab 51 (corresponding to a connecting member lock tab) and a sensing terminal lock tab 52 (corresponding to a sensing member lock tab) are adjacent to each other and each protrude from the side surface of the elastic locking piece 50 that faces the inside of the housing 32 such that the sensing terminal lock tab 52 is located above the busbar lock tab 51. Parts of the lock tabs 51, 52 are overlapped with each other in the up-down direction. The sensing terminal lock tab 52 is located slightly more left than the busbar lock tab 51.

Figure 3:
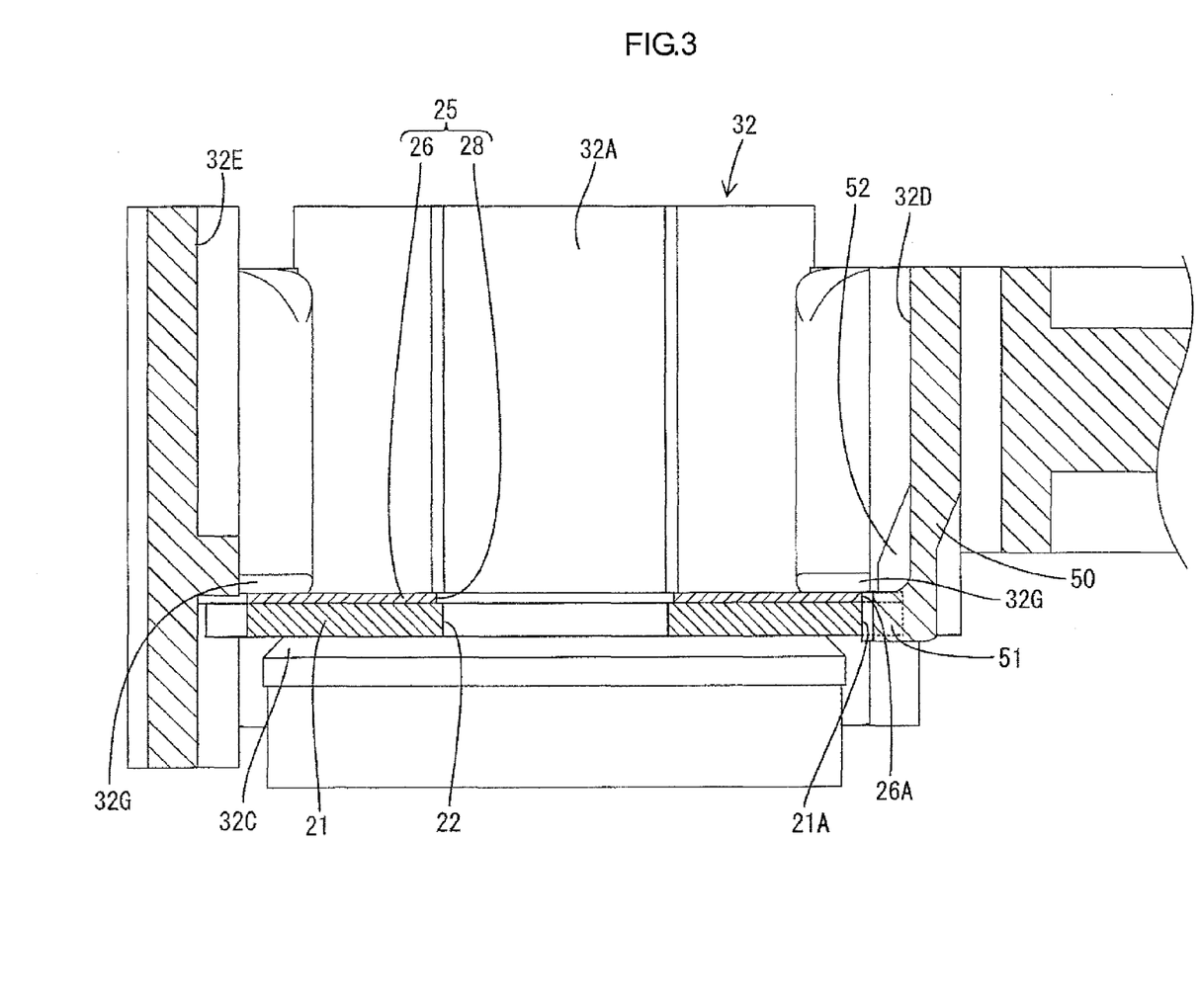
FIG. 3 is a cross-sectional view taken along a line A-A in FIG. 2.
Figure 5:
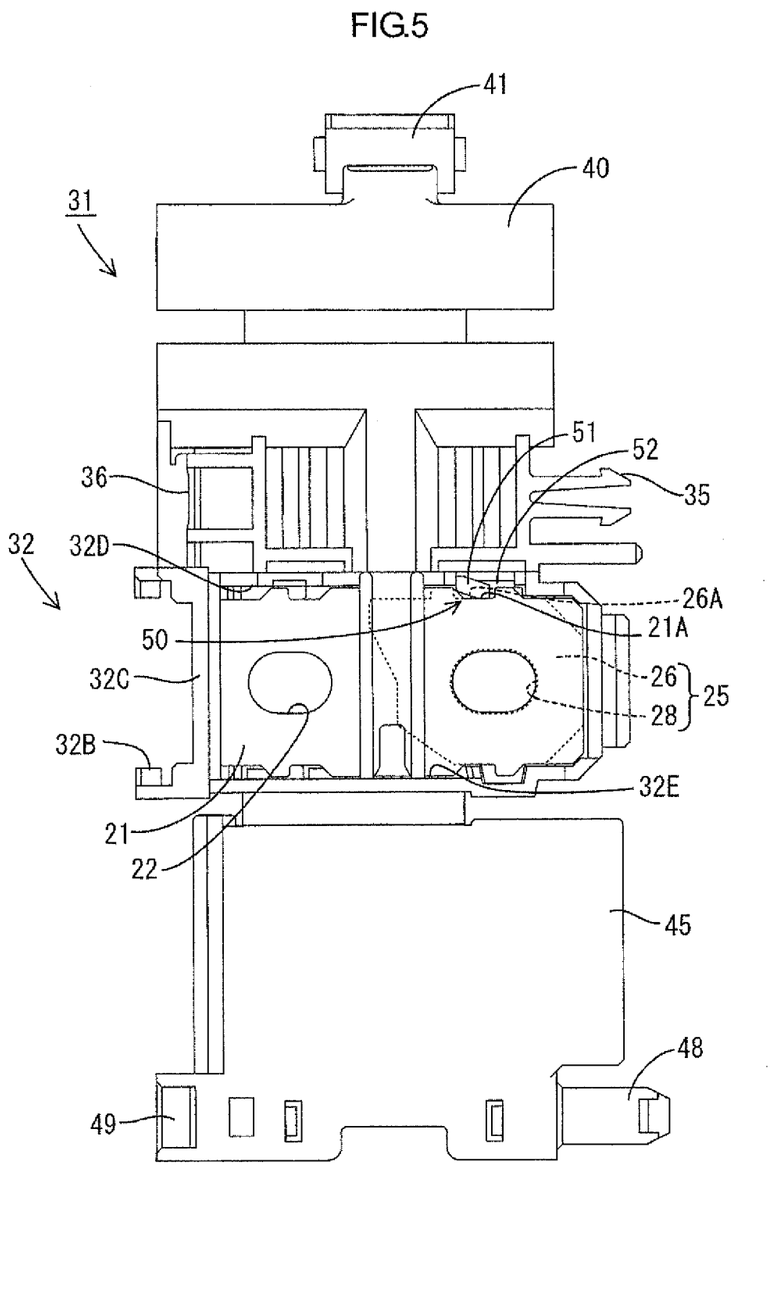
FIG. 5 is a bottom view of FIG. 2.
Figure 6:
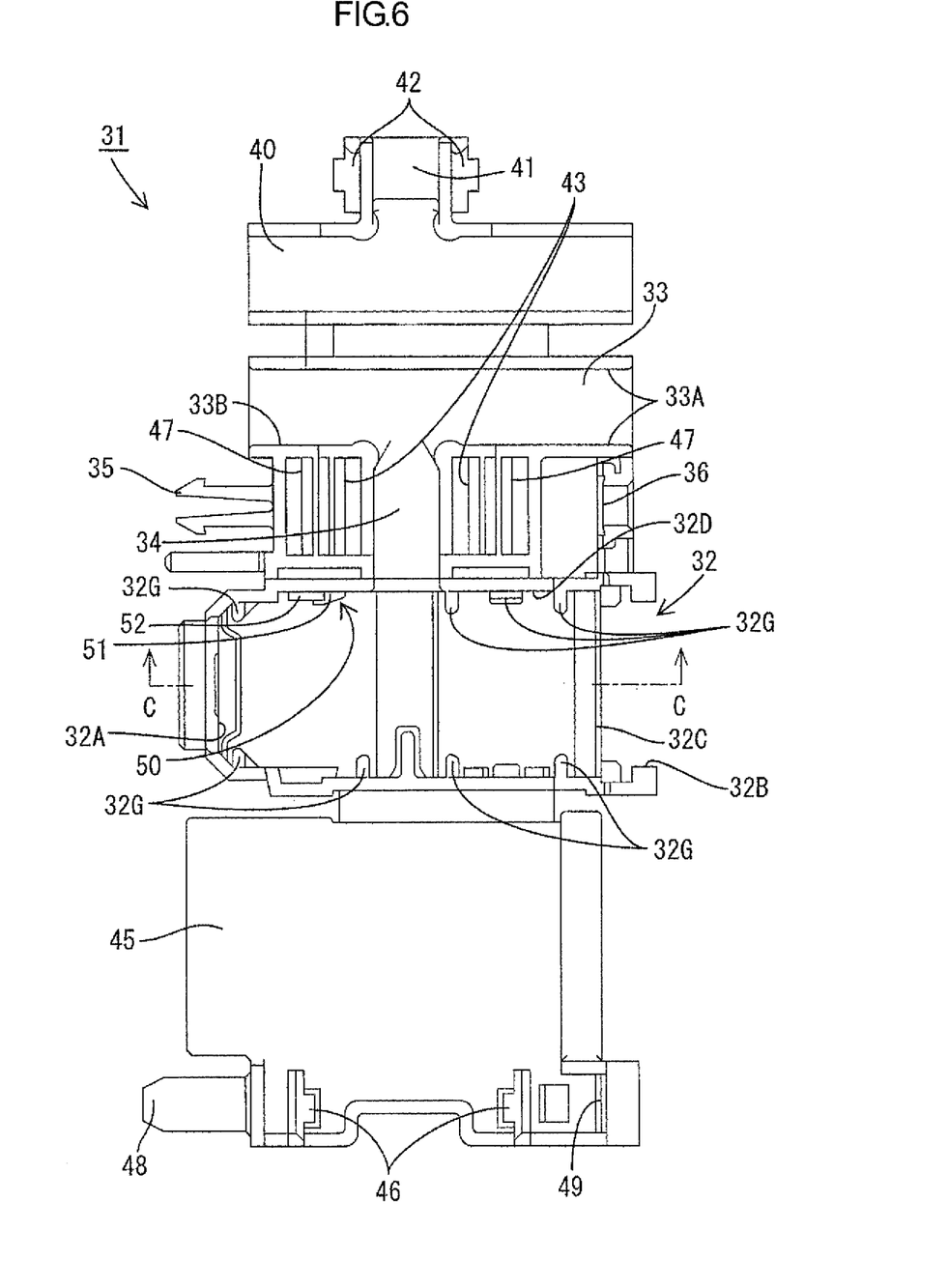
FIG. 6 is a top view of the housing unit.

As illustrated in FIG. 8 and FIG. 9, in a top view, the busbar lock tab 51 has a triangular shape having an inclined side on the side opening 32B side from which the busbar 21 is inserted. The busbar 21 presses the busbar lock tab 51 outwardly of the housing 32 to be housed in the housing 32. As illustrated in FIG. 3 and FIG. 5, the busbar lock tab 51 that is elastically deformed outwardly of the housing 32 is elastically restored in a receiving part 21A that is a cutout formed at a position corresponding to the busbar 21. This locks the busbar 21 so as not to slip out in the right-left direction. The voltage sensing terminal 25 also has an avoidance recess 26A that is a cutout configured to avoid the busbar lock tab 51. As illustrated in FIG. 3, the voltage sensing terminal 25 that is overlapped with the busbar 21 and housed in the housing 32 is located on the side of the busbar lock tab 51.

Figure 4:
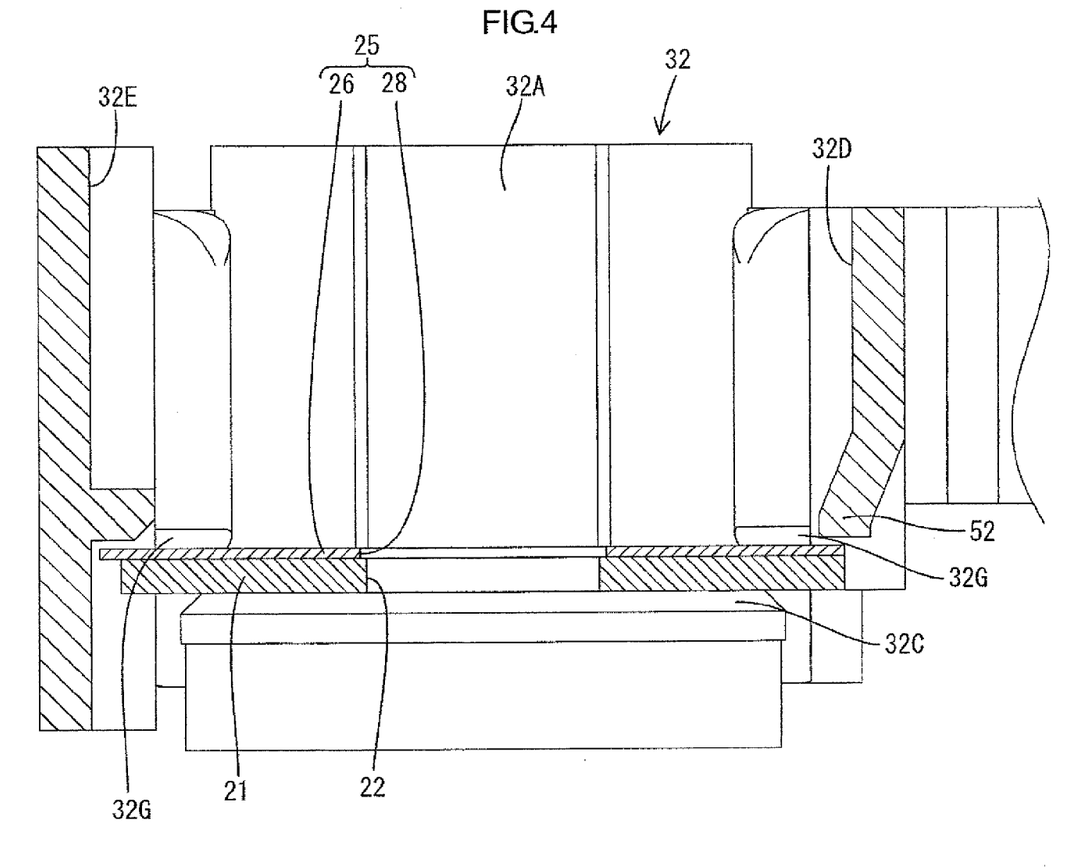
FIG. 4 is a cross-sectional view taken along a line B-B in FIG. 2.

Like the busbar lock tab 51, the sensing terminal lock tab 52 having a rectangular shape in the top view is located on the elastic locking piece 50 that is elastically deformable in the front-rear direction. When the voltage sensing terminal 25 is inserted into the housing 32 from the above, the sensing terminal lock tab 52 is pressed toward the outside of the housing 32 by a side edge of the voltage sensing terminal 25. Then, as illustrated in FIG. 4, after the insertion of the voltage sensing terminal 25, the sensing terminal lock tab 52 is elastically restored, and the sensing terminal lock tab 52 protrudes over the voltage sensing terminal 25. As described above, two lock tabs 51, 52 on one elastic locking piece 50 prevent the busbar 21 from slipping out in the right-left direction and limit the movement of the voltage sensing terminal 25 in the up-down direction. Further, the plate 26 of the voltage sensing terminal 25 includes the avoidance recess 26A, and thus the voltage sensing terminal 25 is placed on the busbar 21 without being locked by the busbar lock tab 51.

Next, an example of an assembly method of the battery wiring module 20 will be described. Initially, the busbar 21 is inserted into the housing 32 from the side opening 32B. As the busbar 21 is pushed inward, the busbar lock tab 51 of the elastic locking piece 50 is elastically deformed to allow the busbar 21 to be inserted into the housing 32. Then, the busbar lock tab 51 is elastically restored to be fitted with the receiving part 21A of the busbar 21, and thus the busbar 21 is locked and cannot be pulled out.

Next, the voltage sensing terminal 25 is fitted onto the busbar 21, which is housed in the housing 32, from the above of the housing 32, and the sensing wire 23 crimped by the voltage sensing terminal 25 is guided to the wire housing groove 33. In this step, the voltage sensing terminal 25 is pushed inwardly from the above, and the sensing terminal lock tab 52 of the elastic locking piece 50 is elastically deformed to allow the insertion of the voltage sensing terminal 25. Then, the sensing terminal lock tab 52 is elastically restored and protrudes over the plate 26 of the voltage sensing terminal 25. This limits the movement of the voltage sensing terminal 25 in the up-down direction.

Before or after the above step in which the voltage sensing terminal is fitted onto the bus bar 21, the housing units 31 are connected with each other. The lock tab for connection 35 is fitted into the locking recess for connection 36 of the adjacent housing unit 31, and the cover connection lock tab 48 is inserted into the cover connection locking hole 49 of the adjacent housing unit 31 with the first cover 40 and the second cover 45 opened as illustrated in FIG. 1. This step is repeated until the housing units 31 in the same number as the cells 11, to which the housing units 31 are attached, are connected, and the assembly of the battery wiring module 20 is completed.

Next, a method of attaching the battery wiring module 20 to the cell group will be described. To the through holes 22 of the busbar 21 and the insertion hole 28 of the voltage sensing terminal 25, which is communicated with the through hole 22, the electrode terminals 12, 13 of the corresponding cell 11 are inserted. A nut, which is not illustrated, is screwed and fastened to each of the electrode terminals 12, 13 that are inserted through the through hole 22, or the through hole 22 and the insertion hole 28. As a result, the electrode terminals 12, 13 that protrude in the same housing 32 and the voltage sensing terminal 25 are electrically connected via the busbar 21.

As described above, according to this embodiment, multiple lock tabs 51, 52 can be gathered in one place by forming the lock tabs 51, 52, which can separately lock the busbar 21 and the voltage sensing terminal 25, on the same elastic locking piece 50. With this configuration, compared to the case in which the lock tabs 51, 52 are formed in different places, the dimension accuracy of the lock tabs 51, 52 can be easily controlled. This simplifies the structure of a molding die for forming the elastic locking piece 50, the busbar lock tab 51, and the sensing terminal lock tab 52. Thus, the die can be provided with a long lasting quality.

In addition, since the elastic locking piece 50 is formed by cutting the surrounding wall frame 32A (the front wall surface 32D in this embodiment), the number of members does not increase, unlike the case in which the elastic locking piece is formed as a separate member from the housing, and thus the cost can be reduced.

In addition, in this embodiment, the busbar 21 and the voltage sensing terminal 25 are inserted from different two directions into the housing 32, i.e., the busbar 21 is inserted from the side opening 32B in the horizontal direction and the voltage sensing terminal 25 is inserted from the upper opening 32F. Even in such a configuration, the lock tabs 51, 52 can be formed on one elastic locking piece 50, and the busbar 21 and the voltage sensing terminal 25 can be locked separately.

Second Embodiment

Next, a second embodiment of the present invention will be described with reference to FIG. 10 and FIG. 11. In a battery wiring module according to this embodiment, a busbar lock tab and a sensing terminal lock tab 72 of an elastic locking piece 70 have different shapes from those of the first embodiment. The parts other than the above has substantially the same configuration as those in the first embodiment, and the parts will be indicated by the same symbols as in the first embodiment and will not be described.

A housing 61 of a housing unit 60 includes an elastic locking piece 70. The elastic locking piece 70 is formed in a front wall surface 64 that is located at a position corresponding to a busbar 62 and a voltage sensing terminal 63 that are overlapped with each other. In other words, the front wall surface 64, which is a part of the surrounding wall frame, is cut from the lower side to integrally form one cantilevered elastic locking piece 70.

The sensing terminal lock tab 72 and the bus bar lock tab, which is not described in detail, protrude from a side surface of the elastic locking piece 70 that faces the inside of the housing 61 such that the sensing terminal lock tab 72 and the busbar lock tab are entirely overlapped with each other in the up-down direction. Like the first embodiment, the busbar lock tab, which is not illustrated, is pushed away by the busbar 62 inserted in the horizontal direction, and the busbar lock tab is elastically restored and fitted into a receiving part of the busbar 62, which is not illustrated, to prevent the busbar 62 from slipping out.

Figure 10:
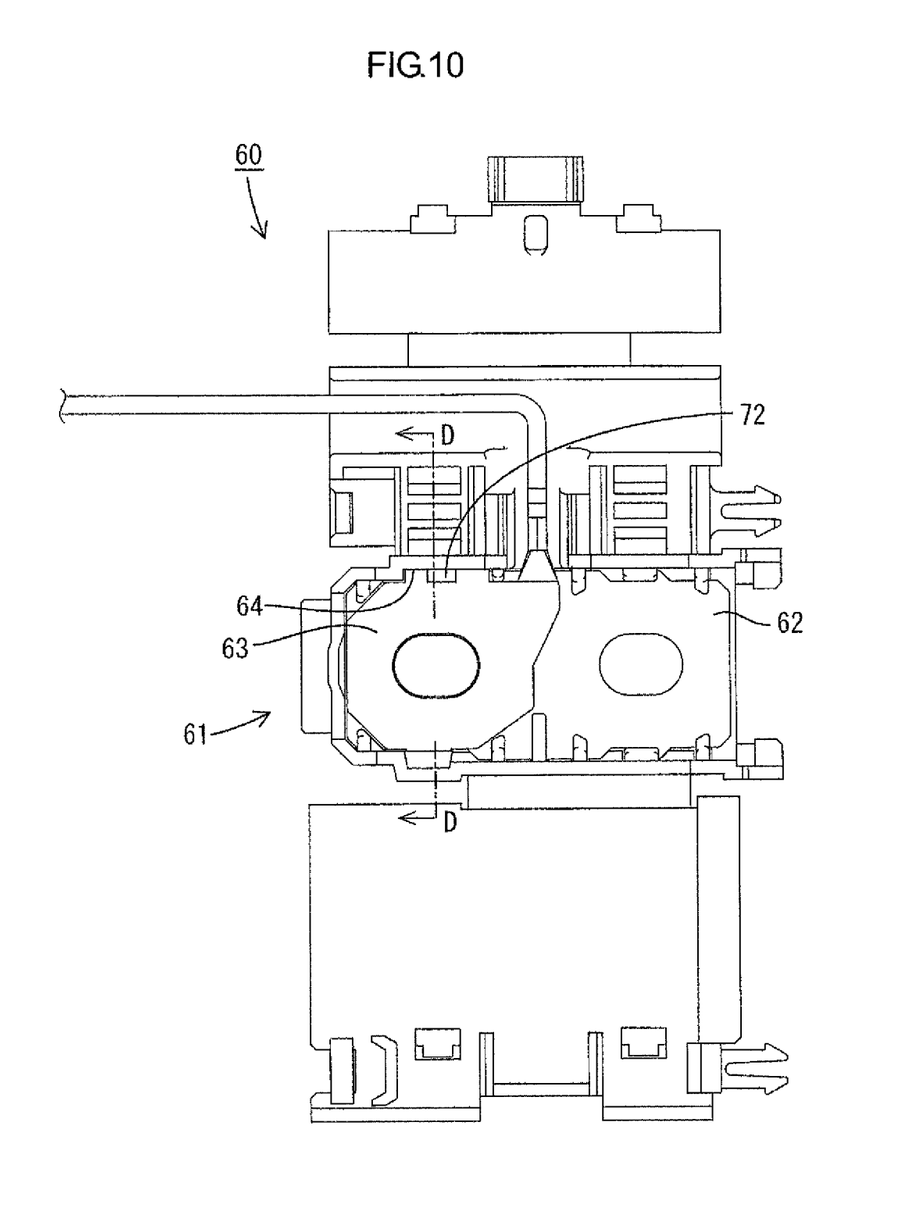
FIG. 10 is a magnified top view of one of housing units of a battery wiring module according to a second embodiment.
Figure 11:
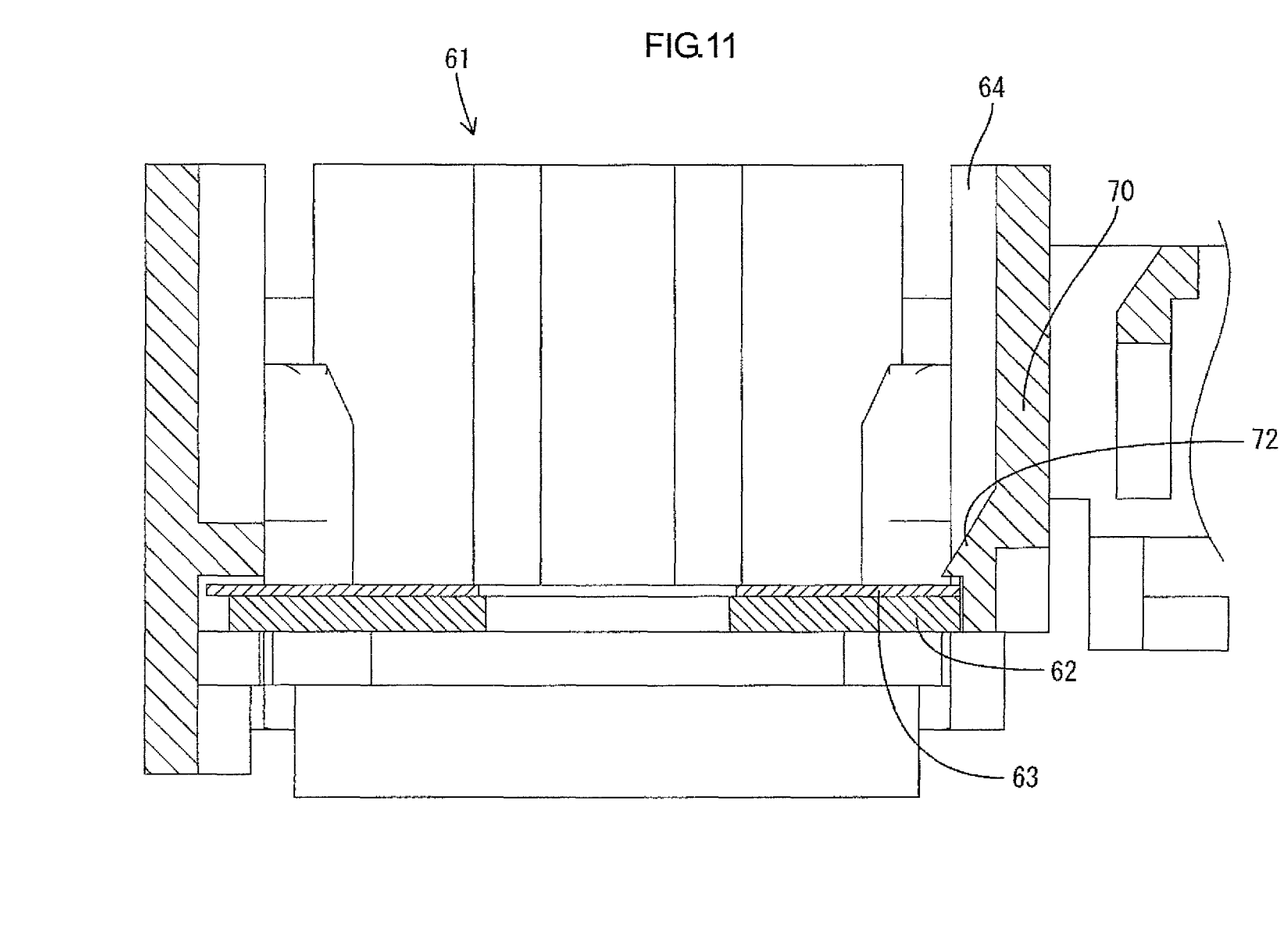
FIG. 11 is a cross-sectional view taken along a line D-D in FIG. 10.

As illustrated in FIG. 10, the sensing terminal lock tab 72 has a rectangular shape in a top view. When the voltage sensing terminal 63 is inserted from the above, like the first embodiment, the sensing terminal lock tab 72 is pressed by a side edge of the voltage sensing terminal 63 toward the outside of the housing 61. Then, as illustrated in FIG. 10 and FIG. 11, after the insertion of the voltage sensing terminal 63, the sensing terminal lock tab 72 is elastically restored and protrudes over the voltage sensing terminal 63. With this configuration, the sensing terminal lock tab 72 and the busbar lock tab that are formed on one elastic locking piece 70 prevent the busbar 62 from slipping out in the right-left direction and limit the movement of the voltage sensing terminal 63 in the up-down direction.

As described above, according to this embodiment, compared to the first embodiment, since the sensing terminal lock tab 72 and the busbar lock tab are formed at substantially the same position in the right-left direction, the elastic locking piece 70 can have a smaller width. With this configuration, the function of the elastic locking piece 70, the sensing terminal lock tab 72, and the busbar lock tab can be maintained and the space can be reduced.

Other Embodiments

The present invention is not limited to the embodiments described in the above description with reference to the drawings. The following embodiments may be included in the technical scope of the present invention.

(1) In the above embodiments, the busbar 21, 62, which is a connecting member, is inserted into the housing 32, 61 in the horizontal direction and the voltage sensing terminal 25, 63, which is a sensing member, is inserted into the housing 32, 61 from the upper opening of the housing 32, 61. However, the sensing member may be inserted into the housing 32, 61 in the horizontal direction like the connecting member, or both of the connecting member and the sensing member may be inserted from the above of the housing. In such a case, a change in shape such as a protrusion length of each lock tab should be made.

(2) In the above embodiments, the electrode terminals 12, 13 of the cell each include a shaft having the threaded circumferential surface. However, the present invention is not limited thereto. Each electrode terminal may have a nut-like shape and may be fastened with a bolt, which is a separate member.

(3) In the above embodiments, the cells 11 are connected in series. However, the present invention is not limited thereto and may be applied to a case in which multiple cells are connected in parallel.

(4) The number of cells included in the battery module 10 is not limited to that in the above embodiments. In addition, the shape of the battery wiring module 20 may be properly determined according to the number of cells 11.

(5) In the above embodiments, the first cover 40 covers the wire housing groove 33 and the second cover 45 covers the housing 32 and the wire guiding groove 34. However, the present invention is not limited thereto. One of the first cover and the second cover may be eliminated, or the first cover and the second cover may be an integral member. Further, the portions covered by each cover are not limited. For example, the second cover may cover all of the housing, the wire guiding groove, and the wire housing groove, or a part of them.

(6) In the above embodiments, the pair of first locking pieces 42 protrudes from the guiding-groove cover 41, and the pair of second locking pieces 46 protrudes from the second cover 45. However, a locking means for maintaining the closed state of the covers is not limited thereto. For example, each of the first locking piece and the second locking piece may be one or three or more.

EXPLANATION OF SYMBOLS

10: battery module
11: cell
12, 13: electrode terminal
20: battery wiring module
21, 62: bulbar (connecting member)
21A: receiving part
23: sensing wire
25, 63: voltage sensing terminal (sensing member)
26: plate
26A: avoidance recess
30: insulation protector
31, 60: housing unit
32, 61: housing
32A: surrounding wall frame (inner wall)
32B: side open end
32C: bottom plate
32D: front wall surface
32E: rear wall surface
32F: upper open end
32G: busbar holder
50, 70: elastic locking piece
51: busbar lock tab (connecting member lock tab)
52, 72: sensing terminal lock tab (sensing member lock tab)

The technology described in the specification relates to a battery wiring module to be attached to a cell group including a plurality of cells each having positive and negative electrode terminals. The battery wiring module includes a connecting member connecting the electrode terminals, a sensing member overlapped with the connecting member and connected to one of the electrode terminals, an insulation protector including a housing and a wire guiding groove, an elastic locking piece formed in the housing and configured to be elastically deformed, a connecting member lock tab formed on the elastic locking piece and configured to lock the connecting member, and a sensing member lock tab formed on the elastic locking piece and configured to lock the sensing member. The sensing member is configured to sense a state of the cell group. The connecting member and the sensing member are housed in the housing. The wire guiding groove is configured to guide a sensing wire extending from the sensing member to extend out of the housing.

As above, multiple lock tabs can be gathered in one place by forming the connecting member lock tab, which locks the connecting member, and the sensing member lock tab, which locks the sensing member, on the same elastic locking piece. With this configuration, compared to the case in which the lock tabs are formed in different places, the dimension accuracy of the lock tabs can be easily controlled. This simplifies the structure of a molding die for forming the elastic locking piece, the connecting member lock tab, and the sensing member lock tab. Thus, the die can be provided with a long lasting quality.

The elastic locking piece may formed by cutting an inner side wall of the housing. The connecting member lock tab and the sensing member lock tab may protrude from the elastic locking piece with the connecting member lock tab and the sensing member lock tab being away from each other in an overlapping direction of the connecting member and the sensing member. As above, since the elastic locking piece is formed by cutting the inner side wall of the housing, the number of members does not increase, unlike the case in which the elastic locking piece is a separate member from the housing. Accordingly, the cost is likely to be reduced.

The insulation protector may include a plurality of housing units connected with each other in a wiring direction of the sensing wire. The housing may include an upper open end and a side open end in a surrounding wall frame constituting an inner side wall. The upper open end opens toward a side opposite to the cell group to which the battery wiring module is attached. The side open end opens in a connection direction of the housing units. The connecting member may be inserted into the housing from the side open end in a horizontal direction. The sensing member may be inserted into the housing from the upper open end. Even in such a configuration in which the connecting member and the sensing member are inserted from different two directions into the housing, the lock tabs can be formed on the same elastic locking piece, and the connecting member and the sensing member can be locked separately.

According to the technology described in the specification, the connecting member and the sensing terminal can be prevented from slipping out with a simple configuration.

The invention claimed is:
1. A battery wiring module to be attached to a cell group including a plurality of cells each having positive and negative electrode terminals, the battery wiring module comprising:
a connecting member connecting the electrode terminals;
a sensing member overlapped with the connecting member and connected to one of the electrode terminals, the sensing member being configured to sense a state of the cell group;
an insulation protector including a housing and a wire guiding groove, the housing in which the connecting member and the sensing member are housed, the wire guiding groove configured to guide a sensing wire extending from the sensing member to extend out of the housing;
an elastic locking piece formed in the housing and configured to be elastically deformed;
a connecting member lock tab formed on the elastic locking piece and configured to lock the connecting member; and
a sensing member lock tab formed on the elastic locking piece and configured to lock the sensing member.

2. The battery wiring module according to claim 1, wherein the elastic locking piece is an inner wall of the housing and has at least one cutout.

3. The battery wiring module according to claim 1, wherein the connecting member lock tab and the sensing member lock tab protrude from the elastic locking piece with the connecting member lock tab and the sensing member lock tab being away from each other in an overlapping direction of the connecting member and the sensing member.

4. The battery wiring module according to claim 1, wherein the housing and the wire guiding groove constitute a housing unit, the housing unit includes a plurality of housing units.

5. The battery wiring module according to claim 4, wherein the insulation protector includes a plurality of housing units connected with each other in a wiring direction of the sensing wire,
the housing includes an upper open end and a side open end in a surrounding wall frame constituting an inner side wall, the upper open end opening toward a side opposite to the cell group to which the battery wiring module is attached, the side open end opening in a connection direction of the housing units, and
the connecting member is inserted into the housing from the side open end in a horizontal direction, and the sensing member is inserted into the housing from the upper open end.

* * * * *